April 23, 1968  G. R. RUSK ET AL  3,379,239
GUIDE MEANS FOR CORE BOXES AND THE LIKE
Filed Oct. 23, 1965  3 Sheets-Sheet 1
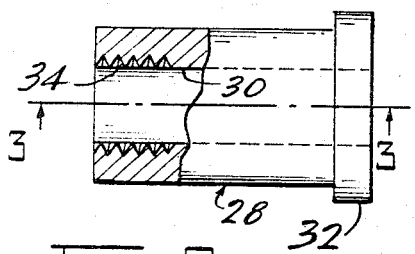
FIG-2-
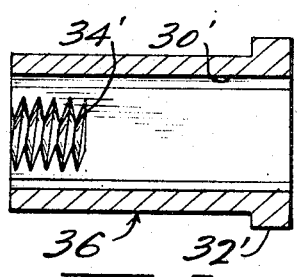
FIG-3-
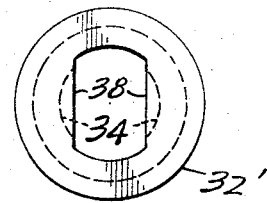
FIG-4-
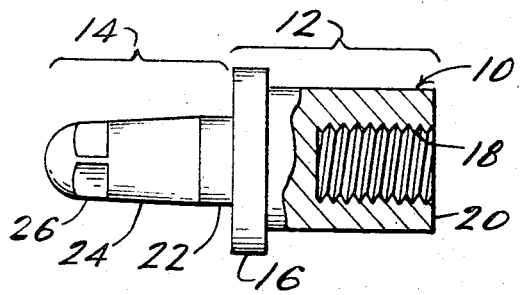
FIG-1-
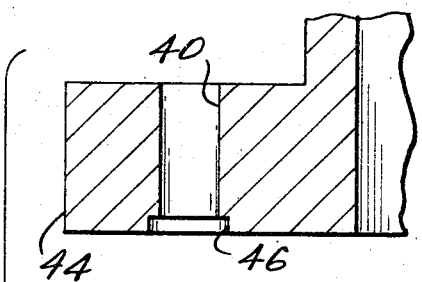
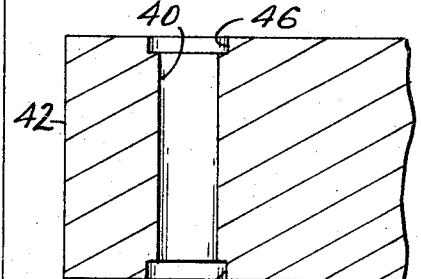
FIG-6-
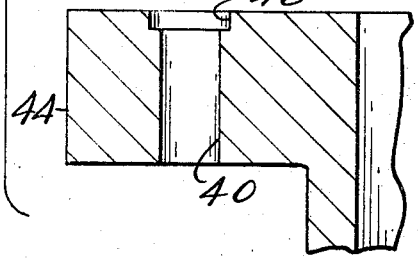
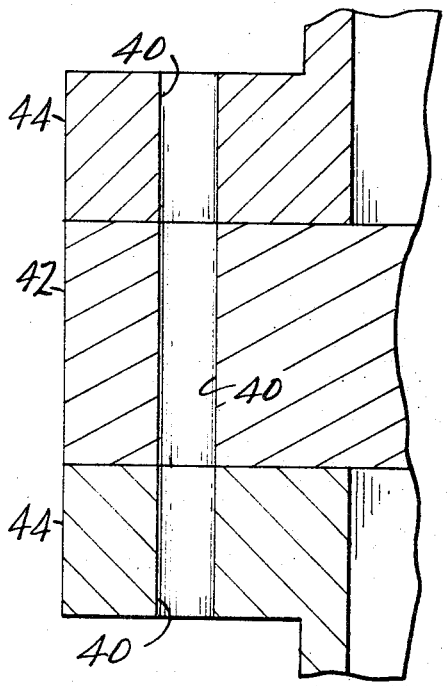
FIG-5-
INVENTORS:
GERALD R. RUSK,
FREDERICK M. HAGQUIST.
BY
ATT'YS.

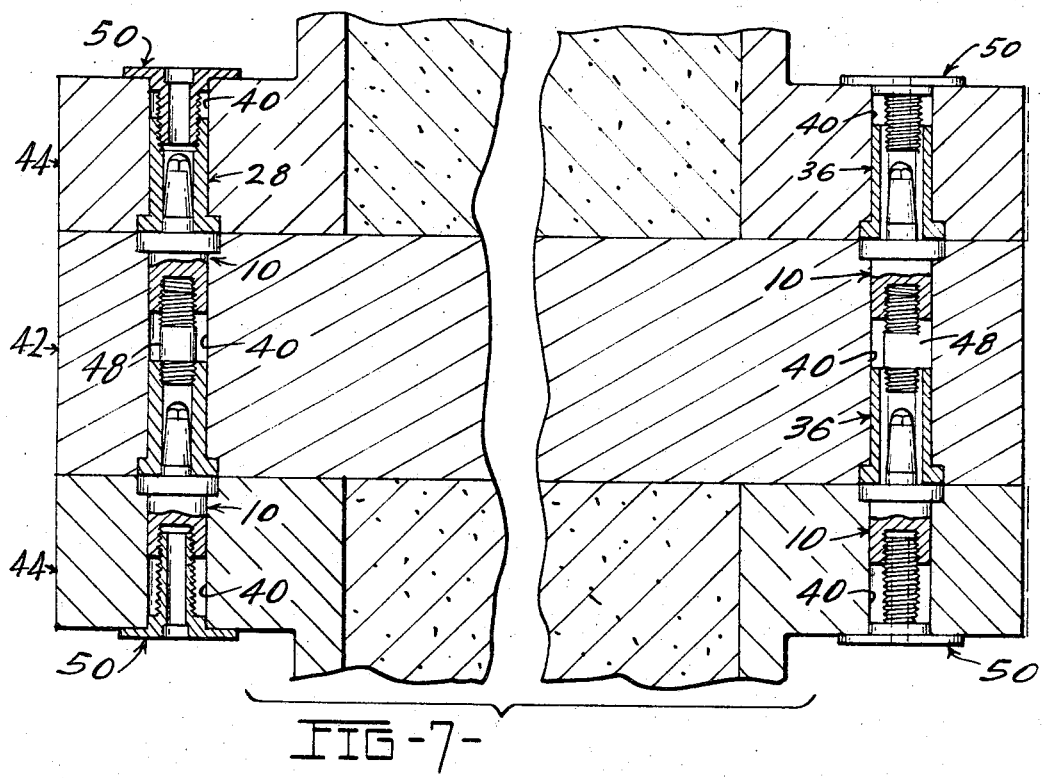
FIG-7-
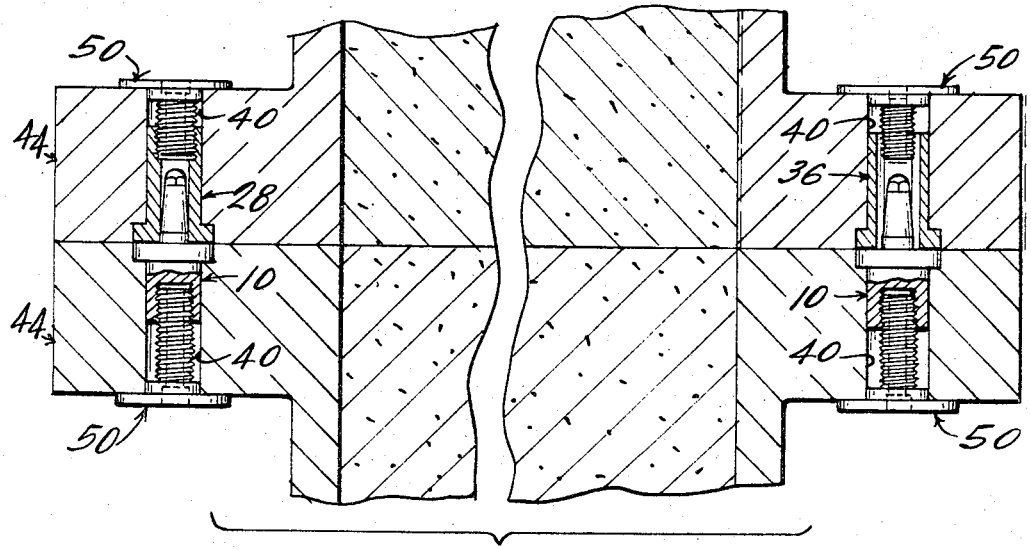
FIG-8-
INVENTORS:
GERALD R. RUSK,
FREDERICK M. HAGQUIST.
BY
ATT'YS.

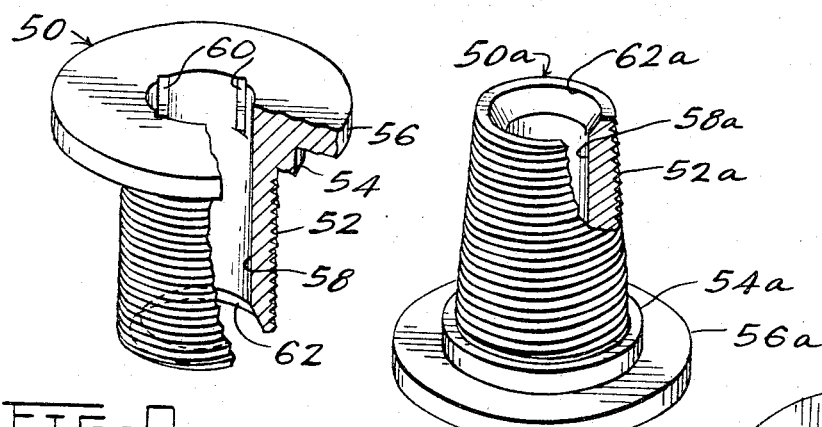
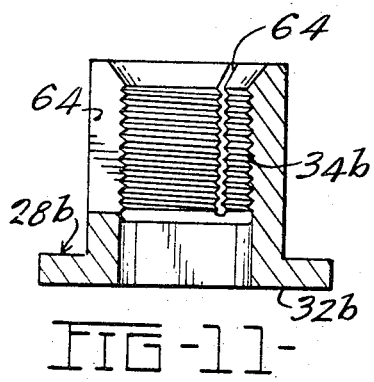
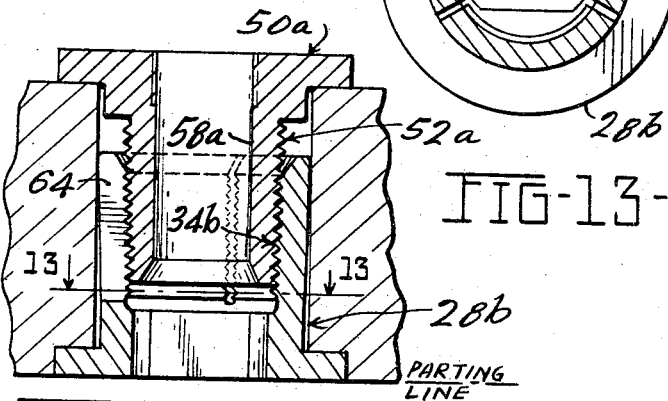
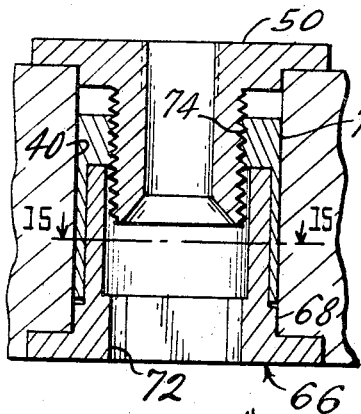
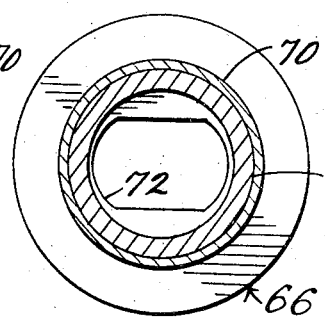
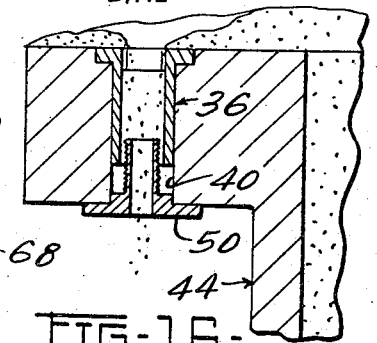
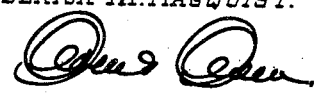

United States Patent Office 3,379,239
Patented Apr. 23, 1968

3,379,239
GUIDE MEANS FOR CORE BOXES
AND THE LIKE
Gerald R. Rusk, Toledo, Ohio, and Frederick M. Hagquist, deceased, late of Toledo, Ohio, by Mrs. Frederick M. Hagquist, executrix, Toledo, Ohio, assignors to Freeman Supply Company, Toledo, Ohio, a corporation of Ohio
Filed Oct. 23, 1965, Ser. No. 504,259
7 Claims. (Cl. 164—387)

The present invention relates to guide means for assembling patterns to core boxes and core boxes to each other; and to a method of installing guide means on the patterns and core boxes.

In the usual sand casting operation for metals, the imprints of opposite half sections of a pattern are produced in sand contained within respective members of a pair of core boxes. The pattern must be accurately aligned with each of the core boxes when making the imprints and the two core boxes must be accurately aligned with respect to each other when the metal is cast. Various means have been used for booking the pattern to the core plates, and the core plates to each other. One of these means has comprised pins set in one of the members and guide bushings in the other of the members for receiving the pins. The pins and guide bushings which have been used, have had external threads thereon, and the members in which they have been installed have had to be tapped and drilled to receive the threads of the pins and guide bushings. The core boxes in which these pins and guide bushings are installed are, of course, heated each time they are booked and metal is poured therein, and the alternate heating and cooling has loosened the threaded connections of the pins and bushings to their core boxes, and subsequent improper alignment has resulted.

The installation of the pins and guide bushings in the core boxes by means of threaded connections is quite expensive and time consuming because it has been necessary heretofore to use a jig boring machine to accurately locate and bore the openings in the respective members so that they will properly book when assembled. This is not only time consuming but requires a high degree of skill with the result that the entire operation is costly.

An object of the present invention is the provision of new and improved guide pins and guide bushings which are securely supported in the core boxes by an improved arrangement that does not include a threaded connection between the pins and guide bushings and the core boxes.

Another object of the invention is the provision of a new and improved method for installing pins and guide bushings in core boxes and the like that does not necessitate the use of jig boring machines.

Another object of the invention is the provision of improved guide pins and guide bushings which allow the patterns and core boxes to be booked, holes drilled through the pattern and core boxes while in a booked arrangement, and the improved guide pins and guide bushings in the openings so drilled without tapping of these holes.

Another object of the invention is the provision of new and improved guide bushings which do not become filled with molding sand and/or other debris.

A further object of the invention is the provision of new and improved guide pins and guide bushings of the above-described type which can be made on a high production basis inexpensively.

A still further object of the invention is the provision of new and improved guide pins and guide bushings which can be tightened in position after they are inserted in their core boxes and the core boxes are booked to provide a degree of self-centering.

A still further object of the invention is the provision of new and improved guide pins and guide bushings of the above-described type having flexible sidewalls which can be wedged outwardly against the sidewalls of their receiving openings in the core boxes to facilitate the above-mentioned self-centering action.

Further objects and advantages will become apparent to those skilled in the art to which the invention relates from the following description of several preferred embodiments described with reference to the accompanying drawings forming a part of this specification, and in which:

FIG. 1 is a side view with a portion broken away of a guide pin for core boxes, pattern plates, etc. which embodies the present invention;

FIG. 2 is a side view of a guide bushing having a round opening therethrough for the reception of the pin shown in FIG. 1, and which view has a portion broken away to better illustrate its internal construction;

FIG. 3 is a longitudinal sectional view of a guide bushing having a slotted opening for the reception of the pin shown in FIG. 1;

FIG. 4 is a top end view of the guide bushing shown in FIG. 3;

FIG. 5 is a fragmentary sectional view of booked pattern and core boxes which have been drilled while in the booked relationship;

FIG. 6 is an exploded fragmentary view of the pattern and core boxes shown in FIG. 5 after the openings thereon have been counterbored adjacent their parting surfaces;

FIG. 7 is a fragmentary sectional view through the pattern and core boxes of FIGS. 5 and 6 after they have had pins and guide bushings embodying the present invention installed therein;

FIG. 8 is a fragmentary sectional view of the core boxes shown in FIG. 7 in booked relationship;

FIG. 9 is an isometric view with a portion broken away of a hold down bushing shown in FIGS. 7 and 8 for holding the guide pins and guide bushings seen in FIGS. 7 and 8 in place;

FIG. 10 is an isometric view with a portion broken away of another embodiment of hold down bushing;

FIG. 11 is a longitudinal section view of another embodiment of hold down bushing;

FIG. 12 is a fragmentary sectional view through a core box showing a guide bushing secured thereto by the hold down bushing of FIG. 11;

FIG. 13 is a fragmentary sectional view taken on the line 13—13 of FIG. 12;

FIG. 14 is a fragmentary sectional view similar to FIG. 12 but showing another embodiment of guide bushing;

FIG. 15 is a fragmentary sectional view taken on the line 15—15 of FIG. 14; and

FIG. 16 is a fragmentary sectional view through a core box at the time it is filled with sand to better illustrate the manner in which the sand enters but does not plug the guide bushings.

The guide pin 10 shown in FIG. 1 generally comprises a hold down portion 12 and a guide portion 14. The hold down portion 12 is generally cylindrical in shape with a flange 16 on its upper end and includes an internal threaded opening 18 that communicates with its lower end 20. The pin portion 14 has a cylindrical guide section 22 adjacent the flange 16 and a tapered portion 24 outwardly of the guide section 22. The outer end of the tapered portion 24 has a plurality of flats 26 milled therein, preferably four, for the reception of a socket wrench.

The guide bushing 28 shown in FIG. 2 is generally similar to the hold down portion 12 of the guide pin 10, but includes a longitudinally extending opening 30 of a size having a sliding fit with respect to the guide section 22 of the guide pin 10. The guide bushing 28 includes a flange 32 identical with the flange 16 adjacent its upper end, and the lower end of the opening 30 is threaded as at 34 for reasons which will later be apparent. The outside diameter of the section beneath the flange 32 is preferably of the same diameter as is the section of the hold down portion 12 of the guide pin 10 beneath its flange 16.

The guide bushing 36 shown in FIG. 3 is generally similar to the guide bushing 28 shown in FIG. 2 but differs principally therefrom in that its opening 30' is slotted, and the threads 34' only occur on the opposite sidewalls 38 of the opening 30'. Those portions of the bushing 36 which correspond to similar portions of the guide bushing 28 are designated by a like reference numeral characterized further in that a prime mark is affixed thereto.

It will be apparent that the respective members of a pair of booked core boxes may heat and cool at different rates, so that it is necessary that these core boxes be fixed at one point by using the pin and bushing of FIGS. 1 and 2, while permitting relative movement at other points by using the pin and bushing shown in FIGS. 1 and 3. The straight sides 38 of the opening 35 engage and guide the guide section 22 of the guide pin 10 while permitting the pin to move longitudinally of the opening 30'.

It is intended that the guide pins and bushings of the present invention can be installed in pattern plates and core boxes by the steps depicted by FIGS. 5, 6, 7 and 8. In the preferred method of installation core boxes are booked to opposite sides of a pattern plate 42 and openings 40 corresponding in diameter to the outside cylindrical surface of the pins 10, and bushings 28 and 36 are drilled longitudinally through the pattern plate 42 and core boxes 44. Thereafter the openings 40 in the pattern and core boxes 44 are counterbored as at 46 adjacent their mating surfaces for the reception of the flanges 16, 32 or 32' as the case may be. After the openings 40 in the pattern plate and core boxes are counterbored, the pins 10 and appropriate bushings 28 and 36 are installed in the openings 40 in a manner shown in FIG. 7. Inasmuch as the two core boxes must be booked, one of the aligning openings in a core box must contain a pin while the other aligning opening must contain a bushing. Since the pattern plate must also book with these two core boxes, one end of its opening must contain a bushing for receiving the pin of one core box while the opposite face of the pattern plate must contain a pin for insertion in a bushing of the other core box. This necessitates an arrangement similar to that shown in FIG. 7.

The pins and bushings will preferably have a slight press fit relative to the openings 40 of the core plate and core boxes. The fit should preferably be one which allows the pins and bushings to be pressed into position with hand tools as opposed to specialized presses. Suitable threaded fasteners are inserted into the opposite ends of the openings 40 of the core boxes and are threaded into the threads 34 or 34' as the case may be, to hold the pins and bushings in place. While washers and machine screws can be used for this purpose, the hold down function is preferably accomplished by means of a hold down bushing 50 later to be described. Opposite pins and bushings in the pattern plate can be held together by studs 48. When the studs 48 are used, one end of its opening 40 should be enlarged slightly so that the pin or bushing received therein can be rotated relative to the sidewalls of the opening 40 to tighten the stud 48. FIG. 8 of the drawings shows the pattern plate 42 removed and the core boxes of FIG. 7 booked ready for receiving the molten metal.

FIG. 9 of the drawings shows the hold down bushing 50 seen in FIGS. 7 and 8. The hold down bushing 50 generally comprises an externally threaded cylindrical body section 52, a short cylindrical guide section 54, and an end flange 56. The hold down bushing 50 has an axially extending opening 58 therethrough having wrench grooves 60 in its end containing the flange 56 and has an outwardly extending taper adjacent its opposite end. The threaded body section can be threaded into either the threaded opening 18 of a pin, or can engage the threads 34 or 34'. When installed in a bushing, sand and other debris which enters the bushing can fall through the axially extending opening 58 of the hold down bushing. The cylindrical guide section 54 although not necessary in all instances may engage the sidewalls of its opening 40 to help center the bushings. The flange 56 will, of course, engage the opposite face of the core boxes to securely hold its cooperating pin or guide bushing in place when the hold down bushing is tightened into the cooperating pin or guide bushing. The hold down bushings 50 can be made with different lengths of threaded body sections 52 to suit various thicknesses of core box flanges, or can be made in lengths longer than the usual requirement, so that end portions can be removed as is necessary to provide proper thread engagement for a particular application.

The embodiment of hold down bushing shown in FIG. 10 is generally similar to that shown in FIG. 9 but differs principally therefrom in that its outside threaded surface is tapered to provide a spreading action of the sidewalls of the guide bushing in which it is inserted. Those portions of the embodiment shown in FIG. 10 which are similar to corresponding portions of the embodiment shown in FIG. 9 are designated by a like reference numeral characterized further in that a suffix "a" is affixed thereto.

The embodiment of guide bushings shown in FIG. 11 is generally similar to that shown in FIG. 2 but differs principally therefrom in that it is slotted as at 64, and three such slots are preferably provided. Those portions of the bushing shown in FIG. 11 which are similar to corresponding portions of the embodiment shown in FIG. 2 are designated by a like reference numeral characterized further in that a suffix "b" is affixed thereto.

FIG. 12 of the drawings shows the hold down bushing of FIG. 10 inserted in the guide bushing of FIG. 11 to lock the bushing 28b in the opening 40 of the core box. When deep sections of core boxes and a pattern plate are booked together and drilled as shown in FIG. 5, run out of the drill will cause the bottom end of the hole to have a larger diameter than the portion first produced by the drill. The guide bushing 28b will have particular advantages when used in the larger diameter openings, inasmuch as its sidewalls can be easily expanded by the tapered hold down bushing 10 to engage the larger diameter sidewalls and hold the guide bushing 28b in place.

FIG. 14 of the drawing shows a guide bushing 66 that is made in two sections 68 and 70, which are pressed together to complete the guide bushing. The guide bushing 66 is shown locked in an opening 40 by means of a hold down bushing 50. The construction of the guide bushing 66 shown in FIG. 14, allows the portion containing the flange to have its central opening 72 slotted by a broaching operation, while the opening 74 in the other section 70 can be threaded by a simple tapping operation. The sections 68 and 70 have a press fit and when forced together will not separate. This two-piece construction, therefore, allows the slotted openings in the guide bushings to be machined quickly and inexpensively.

While the invention has been described in considerable detail, we do not wish to be limited to the particular embodiments shown and described, and it is our intention to cover hereby all novel adaptations, modifications and arrangements thereof which come within the practice of those skilled in the art to which the invention relates.

What is claimed is:

1. A pin and bushing assembly for accurately booking core boxes and the like, said assembly comprising: a pair of bodies each having an axially extending external cylindrical surface with a flange on one end thereof, said cylindrical surfaces being of the same diameter, one of said bodies having an axially extending pin on the opposite side of said flange from said cylindrical surface, said pin having an external guide surface and defining a cylinder of a predetermined diameter smaller than said first mentioned cylindrical surface, the other one of said bodies having an axially extending opening therethrough with a portion thereof having a close sliding fit with respect to said external guide surface of said pin, the end of at least one of said bodies spaced from said flange having a threaded connection, and means having a hold down flange and an axially extending projection the end of which is adapted for threaded engagement with said threaded connection of said one of said bodies.

2. A pin and bushing assembly for accurately booking core boxes and the like, said assembly comprising: a pair of bodies each having an axially extending external cylindrical surface with a flange on one end thereof, said cylindrical surfaces being of the same diameter, one of said bodies having an axially extending pin on the opposite side of said flange from said cylindrical surface, said pin having an external guide surface defining a cylinder of a predetermined diameter smaller than said first mentioned cylindrical surface, the other one of said bodies having an axially extending opening therethrough with a portion having a close sliding fit with respect to said external guide surface of said pin, and a generally tubular member having a generally radially outwardly extending shoulder and a threaded connection which mates with the threaded connection on said one of said bodies, said generally tubular member having an axially extending opening therethrough.

3. A pin and bushing assembly for accurately booking core boxes and the like, said assembly comprising: a pair of bodies each having an axially extending external cylindrical surface with a flange on one end thereof, said cylindrical surfaces being of the same diameter, one of said bodies having an axially extending pin on the opposite side of said flange from said cylindrical surface, said pin having an external guide surface adjacent said flange and defining a cylinder of a predetermined diameter smaller than said first mentioned cylindrical surface, the other one of said bodies having an axially extending opening therethrough with the portion adjacent said flange having a close sliding fit with respect to said external guide surface of said pin, and the opposite end of said opening being threaded, and means having a flange and an axially extending projection the end of which is adapted for threaded engagement with said threaded connection of said other one of said bodies.

4. A pin and bushing assembly for accurately booking core boxes and the like, said assembly comprising: a pair of bodies each having an axially extending external cylindrical surface with a flange on one end thereof, said cylindrical surfaces being of the same diameter, one of said bodies having an axially extending pin on the opposite side of said flange from said cylindrical surface, said pin having an external guide surface adjacent said flange and defining a cylinder of a predetermined diameter smaller than said first mentioned cylindrical surface, the other one of said bodies having an axially extending opening therethrough with the portion adjacent said flange having a close sliding fit with respect to said external guide surface of said pin, the opposite end of said opening being threaded, and a generally tubular member having a generally radially outwardly extending shoulder at one end and an external threaded connection which mates with the threaded end connection on said other one of said bodies, said generally tubular member having an axially extending opening therethrough.

5. A pin and bushing assembly for accurately booking core boxes and the like, said assembly comprising: a pair of bodies each having an axially extending external cylindrical surface with a flange on one end thereof, said cylindrical surfaces being of the same diameter, one of said bodies having an axially extending pin on the oppoiste side of said flange from said cylindrical surface, said pin having an external guide surface adjacent said flange and defining a cylinder of a predetermined diameter smaller than said first mentioned cylindrical surface, the other one of said bodies having an axially extending opening therethrough with the portion adjacent said flange having at least two opposite sides providing a close sliding fit with respect to said external guide surface of said pin, and a generally tubular member having a generally radially outwardly extending shoulder at one end and an external tapered portion on its other end, said tapered portion being threaded for threading into the end of said other one of said bodies remote from its flange to expand said other one of said bodies, said generally tubular member having an axially extending opening therethrough.

6. A pin and bushing assembly for accurately booking core boxes and the like, said assembly comprising: a pair of bodies each having an axially extending external cylindrical surface with a flange on one end thereof, said cylindrical surfaces being of the same diameter, one of said bodies having an axially extending pin on the opposite side of said flange from said cylindrical surface, said pin having an external guide surface adjacent said flange and defining a cylinder of a predetermined diameter smaller than said first mentioned cylindrical surface, the other one of said bodies having an axially extending opening therethrough with the portion adjacent said flange having a close sliding fit with respect to said external guide surface of said pin, the sidewalls of the opposite end of one of said bodies being split, and a generally tubular member having a generally radially outwardly extending shoulder at one end and an external tapered portion on its other end for threading into the opposite end of said opening of said one of said bodies to expand said body, said generally tubular member having an axially extending opening therethrough.

7. A pin and bushing assembly for accurately booking core boxes and the like, said assembly comprising: a pair of bodies each having an axially extending external cylindrical surface with a flange on one end thereof, said cylindrical surfaces being of the same diameter, one of said bodies having an axially extending pin on the opposite side of said flange from said cylindrical surface, said pin having an external guide surface adjacent said flange and defining a cylinder of a predetermined diameter smaller than said first mentioned cylindrical surface, the other one of said bodies having an axially extending oblong opening therethrough with the portion adjacent said flange having two opposite sides providing a close sliding fit with respect to said external guide surface of said pin, the opposite end of said opening having threads which are formed in the opposite more closely spaced sidewalls only, and means having a flange and an axially extending projection the end of which is adapted for threaded engagement with said threads of said other one of said bodies.

References Cited

UNITED STATES PATENTS 3,022,553  2/1962  Hines _____ 164—387 X
3,245,708  4/1966  Kooistra _____ 287—129 X J. SPENCER OVERHOLSER, *Primary Examiner.*

E. MAR, *Assistant Examiner.*